United States Patent [19]
Ritt

[11] Patent Number: 5,281,057
[45] Date of Patent: Jan. 25, 1994

[54] VALVE GUIDE BORING FIXTURE
[75] Inventor: Robert T. Ritt, Holland, Mich.
[73] Assignee: K-Line Industries, Inc., Holland, Mich.
[21] Appl. No.: 868,622
[22] Filed: Apr. 14, 1992
[51] Int. Cl.⁵ .............................................. B23B 41/00
[52] U.S. Cl. ..................................... 408/75; 408/83.5
[58] Field of Search .................. 408/72 B, 75, 80, 88, 408/97, 83.5, 115 R, 115 B, 236

[56] References Cited

U.S. PATENT DOCUMENTS

| | | |
|---|---|---|
| 1,450,511 | 4/1923 | Nielsen . |
| 1,954,241 | 4/1934 | Hellyer ............................. 408/83.5 |
| 2,480,307 | 8/1949 | Santro ............................... 408/83.5 |
| 2,500,340 | 3/1950 | Boulton . |
| 2,885,165 | 5/1959 | Smolen . |
| 2,929,277 | 3/1960 | Hagen . |
| 3,157,068 | 11/1964 | Rickert . |
| 3,230,834 | 1/1966 | Bohannon . |
| 3,333,487 | 8/1967 | Parry . |
| 3,522,758 | 8/1970 | Minelli et al. . |
| 3,531,134 | 9/1970 | Kammeraad . |
| 3,599,992 | 8/1971 | Kammeraad . |
| 3,674,375 | 7/1972 | Reed et al. . |
| 3,764,204 | 10/1973 | Kammeraad . |
| 3,800,391 | 4/1974 | Westbrook . |
| 3,809,046 | 5/1974 | Kammeraad . |
| 3,828,415 | 8/1974 | Kammeraad et al. . |
| 3,828,756 | 8/1974 | Kammeraad et al. . |
| 3,829,105 | 8/1974 | Kammeraad . |
| 3,941,364 | 3/1976 | Hjelm et al. . |
| 3,977,805 | 8/1976 | Wanous . |
| 4,022,583 | 5/1977 | Kammeraad . |
| 4,103,662 | 8/1978 | Kammeraad . |
| 4,185,368 | 1/1980 | Kammeraad . |
| 4,231,693 | 11/1980 | Kammeraad . |
| 4,243,083 | 1/1981 | Serrano . |
| 4,302,882 | 12/1981 | Bradley et al. . |
| 4,365,917 | 12/1982 | Harmand . |
| 4,414,723 | 11/1983 | Kammeraad et al. . |
| 4,417,376 | 11/1983 | Kammeraad et al. . |
| 4,502,696 | 3/1985 | Kammeraad . |
| 4,557,640 | 12/1985 | Rottler . |
| 4,573,340 | 3/1986 | Kammeraad . |
| 4,768,479 | 9/1988 | Kammeraad . |
| 4,822,061 | 4/1989 | Kammeraad . |
| 4,899,458 | 2/1990 | Minelli . |

FOREIGN PATENT DOCUMENTS

| | | |
|---|---|---|
| 747645 | 12/1966 | Canada . |
| 53831 | 5/1989 | Hungary . |
| 53832 | 5/1989 | Hungary . |
| 869384 | 2/1959 | United Kingdom . |

OTHER PUBLICATIONS

Exhibit A is a catalog dated 1986 published by K-Line Industries, assignee of the present application, which on pp. 8-27 disclose various valve guide inserts, tools and fixtures for reworking valve guides and for installing valve guide inserts.

Exhibit B is a catalog dated 1991 published by K-Line Industries, assignee of the present application, which on pp. 7-8 and 16-43 disclose various valve guide inserts, tools and fixtures for reworking valve guides and for installing valve guide inserts.

Primary Examiner—Daniel W. Howell
Attorney, Agent, or Firm—Price, Heneveld, Cooper, Dewitt & Litton

[57] ABSTRACT

A fixture is provided for reworking valve guide bores in a cylinder head of an internal combustion engine, the engine including a valve seat corresponding to each valve guide bore. The fixture includes a frame with supports for holding the cylinder head, a carriage laterally movable on the fixture frame, an arm movably attached to the carriage and extending laterally over the supports, and an alignment member or valve seat bushing pivotally mounted on the arm. A biasing cylinder is operably attached to the carriage and positioned to bias the arm toward th.e cylinder head held on the supports. The alignment member is mounted to the arm in a ball and socket arrangement so that as the alignment member is biased against the valve seat of the cylinder head, the arm exerts a balanced force on the alignment member regardless of angular movement in any direction of the alignment member or flexing of the fixture. Optimally, the alignment member includes a bore that allows removal of the valve guide boring tool and insertion of the tool for inserting a valve guide liner without releasing the biasing force holding the arm and alignment member against the valve seat.

16 Claims, 3 Drawing Sheets

VALVE GUIDE BORING FIXTURE

This invention relates to tools for the reworking of valve guides in cylinder heads for internal combustion engines, and more particularly to fixtures for guiding the reworking operations on valve guides accomplished by means of hand tools.

BACKGROUND OF THE INVENTION

In the past, valve guide reworking operations have been accomplished by using either large and immovable machines requiring the precise mounting of cylinder heads on the machine at an angle in order to produce the proper reworking alignment, or small tools which could be mounted on the cylinder head. The large machines typically include a heavy base on which is mounted a drill press or other boring tool, thus necessitating the mounting of the cylinder head in a precise position to provide the proper alignment with the drill press. The cylinder head mounting on these machines is a tedious operation and one which, of necessity, must be repeated for each valve guide since the intake and exhaust valve guides in modern engines are often formed at opposing angles.

The smaller tools, which could be mounted on the cylinder head when the cylinder head was in any position, were based on alignment principles which often produce inaccurate results. One smaller tool utilized the principle of aligning the guide tool with the valve guide bore by means of the valve spring seat on the side of the cylinder head opposite the valve seat. However, valve spring seats are normally not concentrically located with respect to the valve guide bore, thus causing this method to be inaccurate. Other small tools for the reworking operations necessitated mounting the guide fixture on the cylinder head by means of one of the many holes provided in the cylinder head to mount the head on the engine block. However, if the mounting hole was in any way deformed or displaced, the capability of aligning the tool properly was thereby reduced.

One fixture for reworking valve guides solving the aforementioned problems was disclosed in U.S. Pat. No. 3,764,204 to Kammeraad, issued Oct. 9, 1973, and entitled VALVE GUIDE BORING FIXTURE. The arrangement shown in U.S. Pat. No. 3,764,204 requires a valve seat engaging means 40 and a spring seat engaging means 80 which engage opposite sides of a cylinder head. This is not always convenient, and also can require extra set-up time to repeatedly lift and move the cylinder head between successive valve guides to be reworked. Further, the valve seat engaging means 40 includes a ball swivel guide 42 pivotally mounted on fixture arm 18, an elongated guide/bushing 60 that extends through ball swivel guide 42 in a semipermanent arrangement therein, and a valve seat adapter 70 threadably mounted onto bushing 60. The three-piece construction of guide 42, bushing 60 and valve seat adapter 70 can add complexity and looseness in the valve seat engaging arrangement leading to reduced accuracy of alignment to the particular valve guide being reworked if the arrangement is not properly maintained and adjusted. For example, in practice, some operators have adjusted valve seat adapter 70 to a low position on elongated bushing 60. This causes an unnecessarily long distance between the valve seat 106/108 and the fixture arm 18, which can reduce the accuracy of alignment when arm 18 biases valve seat adapter 70 against the selected valve seat. In particular, the greater the distance between valve seat 108 and ball swivel guide 42, the less stable the arrangement. This can reduce the accuracy of alignment as the fixture flexes during use. Still further, the guide/bushing 60 cannot be removed or replaced without releasing valve seat adapter 70 from valve seat 106/108. For example, it may be desirable to change bushing 60 so that a different diameter boring tool can be used. With the device disclosed, valve seat adapter 70 must be released from engagement with valve seat 108.

At least one fixture for reworking valve guide bores has been manufactured which utilizes a forked arrangement for supporting a valve seat engaging adapter. See Hungary Patent Publication 53832, filed May 16, 1989. The forked arrangement includes a pair of fingers that extend laterally and loosely support the valve seat engaging adapter therebetween, permitting the adapter to both tilt and slide on the fingers as the adapter is biased into engagement with the valve seat. In theory, this allows the adapter to assume an optimal position which is concentrically aligned with the centerline of the valve seat and the valve guide bore. However, in practice, the forces generated by the fingers are not always concentrically balanced with respect to the valve seat centerline. For example, this may occur if the arm supporting the forked arrangement is adjusted too high or too low relative to the valve seat. Hence, the adapter takes on a compromised position that is a complex reaction to forces generated by the valve seat on the valve seat adapter, the frictional forces generated by movement and flexing of the fixture, and the unbalanced forces generated by the forked supporting arrangement. Thus, an improved fixture is desired which solves the aforementioned problems.

SUMMARY OF THE INVENTION

One aspect of the present invention is to provide a fixture for the reworking of valve guides in a cylinder head of an internal combustion engine, the cylinder including a valve seat corresponding to each valve guide, each valve having a central axis. The fixture includes a frame, a means on the frame for supporting the cylinder head, a carriage movably mounted on the frame for movement relative to the cylinder head in a first direction, and an arm movably mounted on the carriage for movement in a second direction transverse to the first direction. The arm includes a free end that can be selectively positioned in proximity to a selected valve seat and the valve guide associated therewith by moving the carriage with respect to the frame and by moving the arm with respect to the carriage. An alignment member having a central bore therethrough includes means for engaging the valve seat such that the axis of the central bore is aligned with the central axis of the associated valve guide. Means is provided for joining the alignment member to the free end of the arm, the joining means including at least a partial ball-and-socket joint, the joining means permitting angular movement of the alignment member in any direction, such that the alignment member can be positioned with the axis of the bore aligned with the central axis. Means is also provided for positioning the alignment member such that the axis of the bore is aligned with the central axis of the valve guide, along with means for biasing the engaging means into engagement with the valve seat, the joining means permitting the axial aligrment of the axes of the bore and the central axis to be maintained despite relative movement between the fixture and the valve seat. In the preferred embodiment, the alignment member is a single-piece member releasably retained to the free end of the arm by a U-shaped ball retainer that is slidably mounted on a socket section on the free end.

In another aspect, the alignment member is a single-piece member which has a ball section, a valve seat engageTaent section and a stem interconnecting same. In the preferred embodiment, the alignment member has a length of about one inch from the valve seat engagement section to the center point of the sphere defined by the ball section.

These and other features, advantages and objects of the present invention will be further understood and appreciated by those skilled in the art by reference to the following specification, claims and appended drawings.

BRIEF DEURIPTION OF THE DRAWINGS

DETAILED DESCRIPTION OF THE PREFERREDA-MBODIMENT

Figure 1:
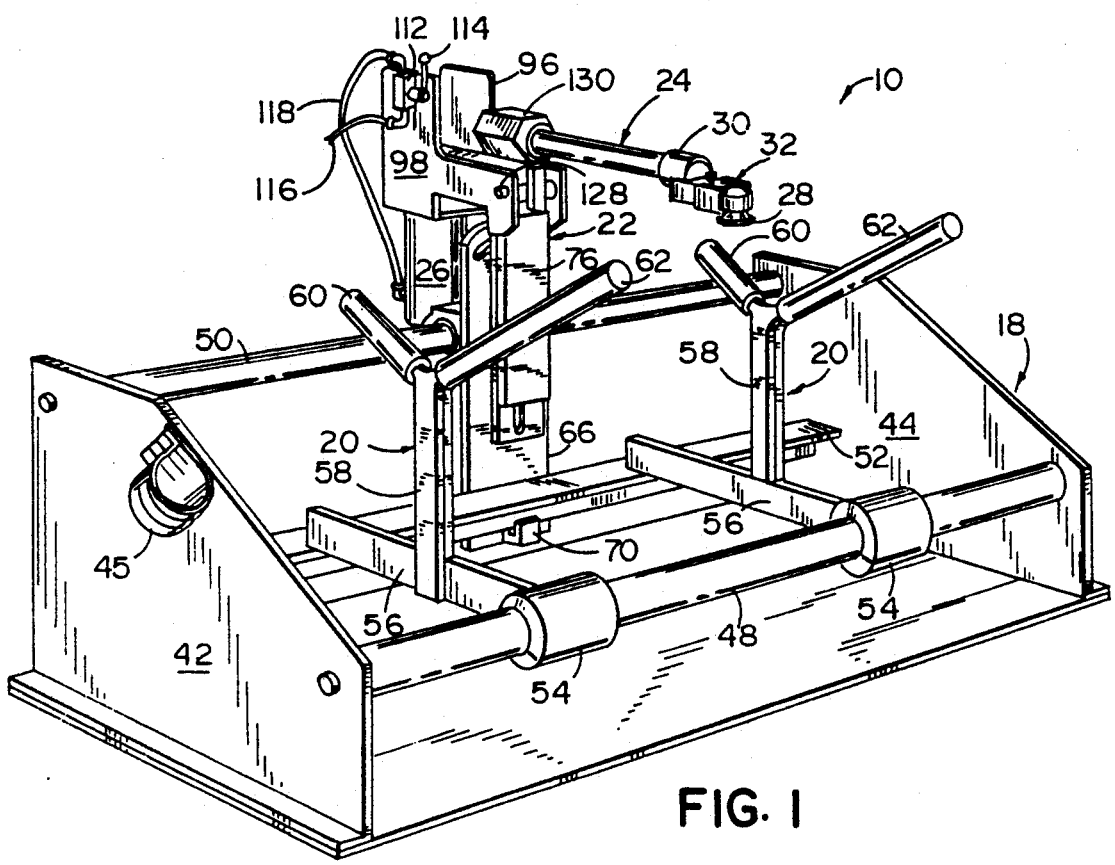
FIG. 1 is a perspective of a fixture embodying the present invention.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations, except where expressly specified to the contrary. It is also to be understood that these specific devices and processes illustrated in the attached drawings and described in the following specification are simply exemplary embodiments of the inventive concepts defined in the appended claims. Hence, specific dimensions and other physical characteristics related to the embodiments disclosed herein are not to be considered as limiting, unless the claims expressly state otherwise.

Figure 2:
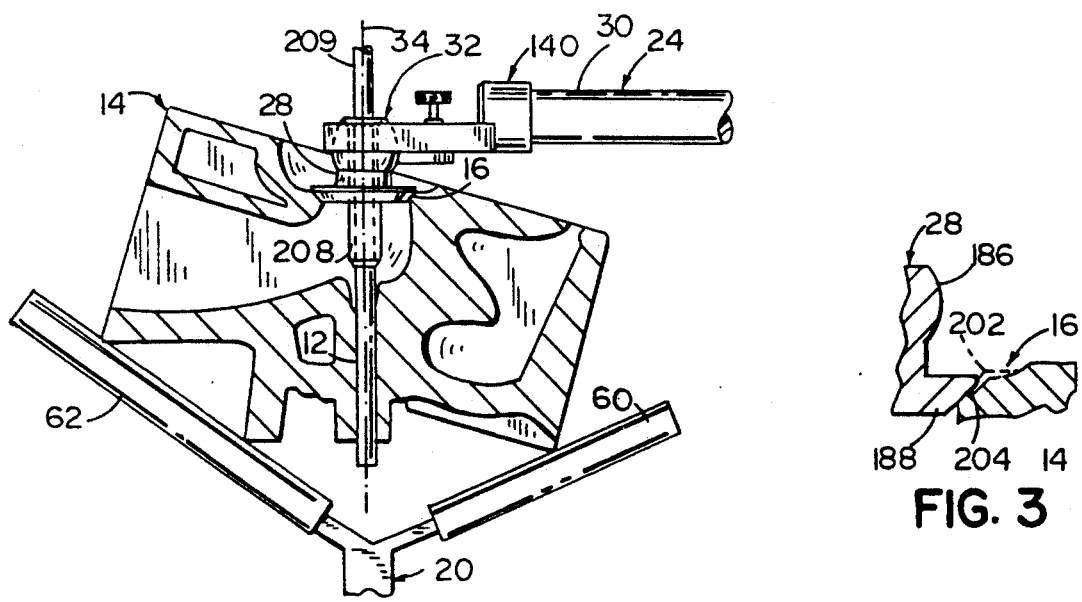
FIG. 2 is a fragmentary, side cross-sectional view of the valve guide boring fixture clamped in place on a cylinder head during the alignment step.

A fixture 10 (FIGS. 1 and 2) embodying the present invention is provided for reworking valve guides 12 in a cylinder head 14 of an internal combustion engine (not shown). In particular, fixture 10 facilitates the reboring of a worn valve guide so that a valve guide insert such as is disclosed in U.S. Pat. No. 4,768,479 to Kammeraad, issued Sep. 6, 1988, and entitled OIL-SEALING VALVE GUIDE INSERT AND METHOD OF MANUFACTURE, or in commonly-owned, copending application Ser. No. 07/869,418, filed Apr. 14, 1992) (K-Line P-331) to Kammeraad, entitled VALVE GUIDE INSERT, can be inserted into the bored valve guide. Cylinder head 14 includes a valve seat 16 corresponding to each valve guide 12. Fixture 10 is provided with a unique alignment member 28 adapted to engage valve seat 16. A partial universal joint 32 on fixture 10 allows fixture 10 to maintain alignment of the alignment member 28 with the central axis 34 of valve guide 12 as alignment member 28 is biased against valve seat 16 despite any flexing of fixture 10. Optimally, alignment member 28 includes a bore 36 that allows successive tools and/or bushings to be inserted through alignment member 28 into engagement with valve guide 12 without disengaging alignment member 28 from valve seat 16, thus providing improved alignment during the process of reworking the valve guide.

Fixture 10 (FIG. 1) includes a frame 18 with upright supports 20 for holding cylinder head 14, a carriage 22 laterally movable on frame 18, and an arm 24 movably attached to carriage 22 and extending forwardly over supports 20. A biasing cylinder 26 is operably attached to frame 18 to bias arm 24 toward a cylinder head 14 held on supports 20. Cylinder 26, preferably an air cylinder, includes a spring retractor such that arm 24 can be moved free upwardly once the cylinder is depressurized.

An alignment member 28 is mounted for limited universal movement to the free end 30 of arm 24 and adapted to engage valve seat 16. Alignment member 28 is mounted to arm 18 at universal joint 32 which, in the preferred form, is a ball-and-socket arrangement. Universal joint 32 comrAunicates balanced forces therethrough so that as the aligrment member 28 seats against a selected valve seat 16 of cylinder head 14, arm 24 exerts a continuously-balanced force on alignment member 28 regardless of the angular movement in any direction of alignment member 28, arm 24 or cylinder head 14 due to flexing of fixture 10.

In'-particular, frame 18 (FIG. 1) includes upright sidewalls 42, 44 which are securely attached to a base plate 46. A tool holster or holder 45 is shown attached to the side of wall 42 for convenience of the operator. Two rods 48 and 50 and a stabilizer bar 52 extend between and are securely attached to sidewalls 42, 44. Rod 48 extends across the front of frame 18 and bar 52 extends across the rear of frame 18. Bar 52 is slightly lower than rod 48. Rod 50 extends across the rear of frame 18 a distance above bar 52. The illustrated frame 18 can be placed on a workbench or the like. It could also be attached to a wheeled cart or other movable means as needed to meet the portability requirements of the particular location of use.

A pair of cylinder head supports 20 are independently slidably mounted on front rod 48 by bearings 54 so that supports 20 can be slidably moved laterally to a d6sired spacing. Supports 20 each include an inverted T-shaped bracket including a lower, substantially horizontal bar 56 that spans between bearing 54 and rear bar 52, and a substantially vertical bar 58 connected to horizontal bar 56. Supports 20 also include an L-shaped cylinder head cradle having a rearwardly angled leg 60 and a forwardly angled leg 62. Legs 60, 62 can be covered with a spongy or rubber-like material to more securely hold cylinder head 14 thereon. As shown, supports 20 are shaped to loosely hold a variety of different styles of cylinder heads. However, it is contemplated that the cradle can be designed to securely retain a particular cylinder head design if so desired.

Figure 4:
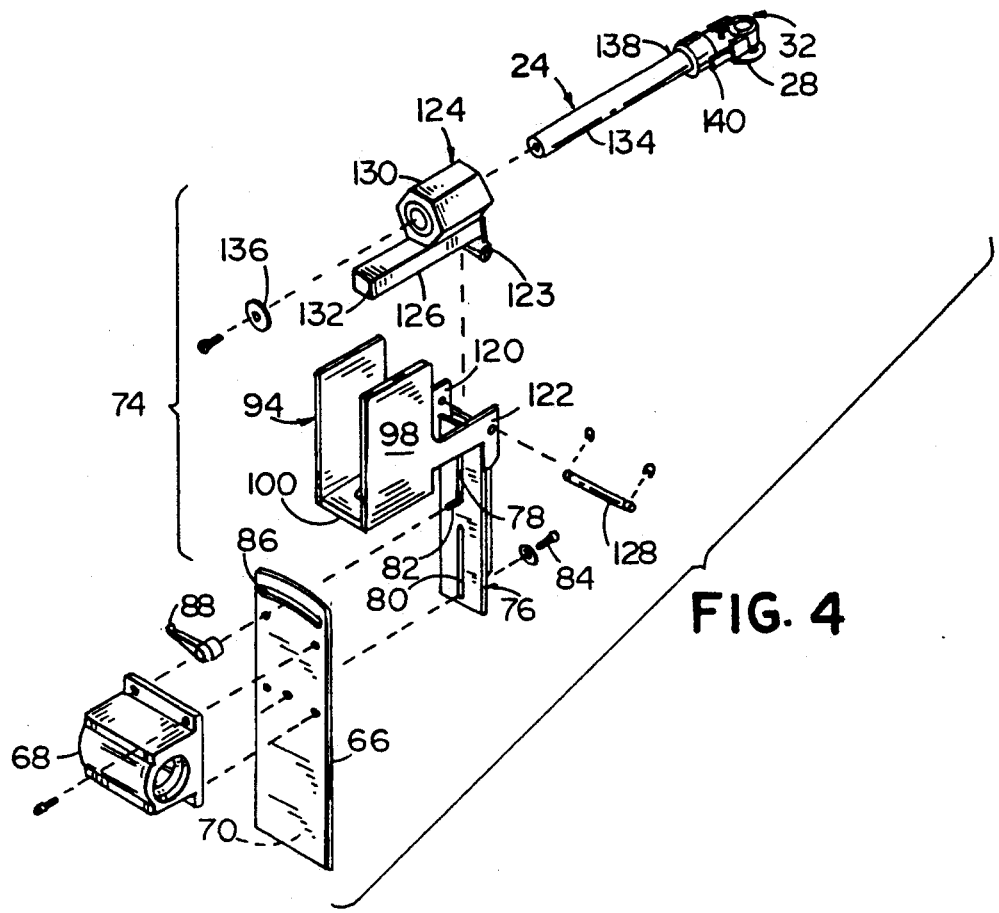
FIG. 4 is an exploded, rear perspective view of the carriage and arm of the fixture shown in FIG. 1.
Figure 5:
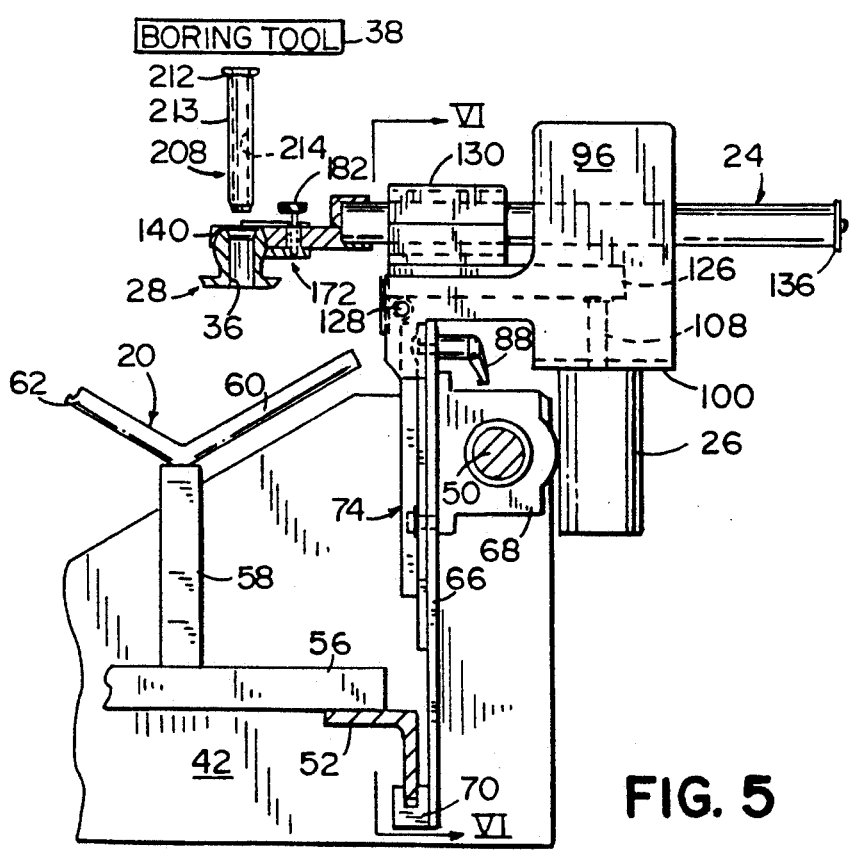
FIG. 5 is a fragmentary, side-elevational, cross-sectional view of the fixture in FIG. 1.
Figure 6:
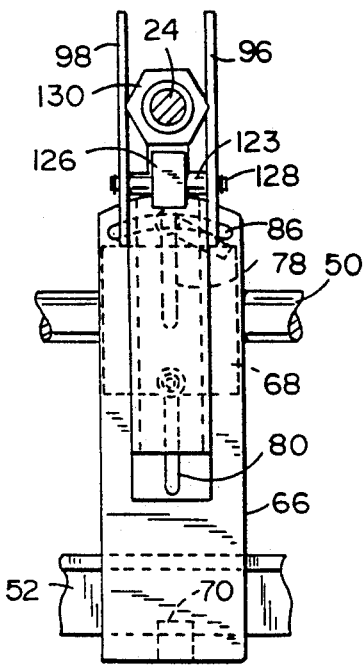
FIG. 6 is a front-elevational, cross-sectional view taken along the plane VI—VI in FIG. 5 with several hidden lines having been removed for clarity.

Carriage 22 (FIGS. 4–6) includes a vertical bearing member 66 connected to upper rod 50 by a bearing 68. Member 66 includes a lower, C-shaped catch 70 (FIG. 5) slidably engaging rear stabilizer bar 52 to retain member 66 in a substantially vertical position. Member 66 can be slidably moved from side-to-side as needed to position arm 24 over a selected valve guide 12 to be reworked.

Carriage 22 further includes an arm holder 74 vertically slidably attached to bearing member 66. In particular, arm holder 74 includes a vertical tubular post 76 with two slots 78, 80 located on a rearward side for receiving studs 82, 84, respectively. Member 66 further includes an arcuate slot 86 (FIG. 6) for receiving upper stud 82, arcuate slot 86 cooperating with vertical slot 78 and tubular post 76 to allow angular movement of arm holder 74 with respect to member 66 about lower stud 84. A handle 88 includes a bore threaded to receive upper stud 82. By twisting handle 88, stud 82 can be loosened and arm holder 74 can be lifted, lowered or tilted as desired.

Arm holder 74 (FIGS. 4–6) includes an upper bracket 94 formed by sidewalls 96, 98 which are welded to horizontal plate 100 and to tubular post 76. The pneumatic cylinder 26 (FIG. 5) is attached to the undersurface of plate 100 with piston/rod 108 extending upwardly through a suitable aperture in plate 100. A control valve 112 (FIG. 1) is mounted to sidewall 98 and includes a control lever 114. Compressed air supply hose 116 is connected to a compressed air supply (not shown) to supply compressed air to control valve 112. Valve 112 is shiftable by control lever 114 to supply the compressed air through delivery hose 118 to cylinder 26. Rod 108 is normally retracted, but extendable when compressed air is supplied to cylinder 26.

Sidewalls 96, 98 also include forwardly located flanges 120, 122 (FIGS. 4–6) which extend upwardly from and are affixed to tubular post 76. A linear bearing subassembly 124 includes a pivot bar 126 pivotally mounted on pivot pin 128 between flanges 120, 122 by a tube 123. Linear bearing 130 is mounted to the top of pivot bar 126. Pivot bar 126 extends rearwardly at 132 to extend over extendable cylinder rod 108, so that rod 108 can bias pivot bar 126 and linear bearing subassembly 124 (as well as arm 24) counterclockwise (FIG. 5) when rod 108 is extended. Arm 24 includes a rod-like body 134 which extends through linear bearing 130, arm 24 being rotatable and forwardly and rearwardly slidable within bearing 130. Arm 24 has a stop washer 136 at its rearward end and an opposing free end 138 which extends forwardly over cylinder head 14 located on supports 20.

Figure 7:
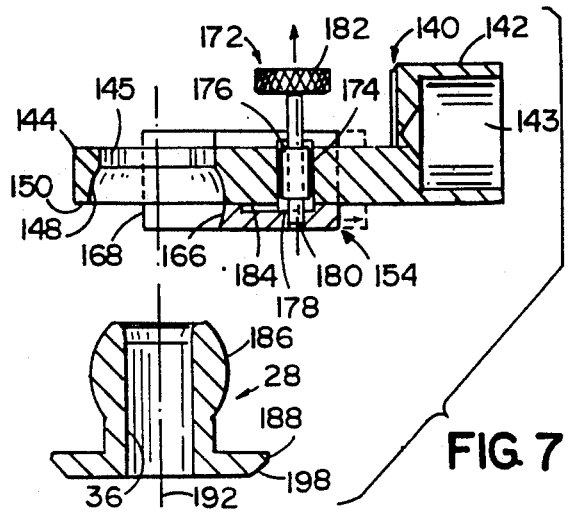
FIG. 7 is an enlarged, partially-exploded, cross-sectional view of the universal joint shown in FIG. 2.
Figures 8, 9:
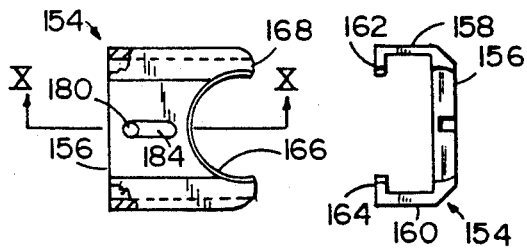
FIGS. 8-10 are various views of a ball retainer shown in FIG. 7.
Figure 10:
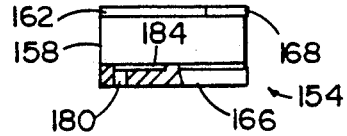

Socket bar 140 (FIG. 7) includes an enlarged rear end 142 with a bore 143 adapted to press-fittingly receive free end 138 of arm 24, and a socket section 144 extending forwardly from rear end 142. Socket section 144 has a substantially continuous, rectangular, cross-sectional shape and includes cylindrical aperture 145 extending downwardly and partially through its outer terminal end. Depending from aperture 145 in skirt-like fashion is a socket segment 148. Socket segment 148 is of a spherical nature and adapted to matingly receive spherical ball section 186 of alignment member 28 from the lower side 150 of socket section 144 as described below.

A U-shaped ball retainer 154 (FIGS. 7–10) is slidably mounted to the underside of socket section 144 with a crosspiece 156 resting against it. U-shaped ball retainer 154 further includes fingers 158, 160 which extend upwardly around the sides of socket section 144. Fingers 158, 160 include tips 162 and 164 that retain bracket 154 slidingly to socket section 144. Socket retainer 154 includes a mating socket segment 166 in the outer end 168 of crosspiece 156 which faces upwardly. Socket segment 148 and socket segment 166 together encapsulate ball section 186 when ball retainer 154 is in the position shown in FIG. 5. Ball retainer 154 can be moved rearwardly, opening the lower portion of the socket such that ball segment 186 retained therein will be released and will drop out downwardly. A spring-biased, vertically slidable pin 172 (FIG. 7) is mounted in an aperture 174 in socket section 144. Pin 172 includes a tip 178 that enters a hole 180 in crosspiece 156 of ball retainer 154, but which is releasable by pulling upwardly on the head 182. In the pulled or retracted position, pin tip 178 is withdrawn far enough to release pin tip 178 from hole 180, but not far enough to release same from a slot 184 in retainer 154. Slot 184 extends a distance along retainer 154 and, since pin tip 178 remains engaged with slot 184 when retracted, slot 184 limits the travel of U-shaped bracket 154 as same slides on socket section 144.

Alignment member 28 (FIG. 7) is a one-piece part having an upper ball section 186 that is partially spherically-shaped, a lower valve seat engagement portion 188 that is frusto-conically shaped and a stem 189 located interconnectingly therebetween. Alignment member 28 includes an upper end 191 and has an internal vertical bore 36 longitudinally extending through alignment member 28 which defines a centerline 192. Ball segment 186 is matingly engaged by the socket segments 148, 146 to form universal joint 32 and to affix alignment member 28 to the free end of arm 24. The spherical shape allows segments 148, 146 to apply pressure to alignment member 28 in a balanced and unbiased condition while allowing alignment member 28 to angularly move in any direction.

Lower valve seat engagement portion 188 of alignment member 28 is designed to operably engage and align with the bore of a selected valve seat 16. If fixture 10 flexes as cylinder 26 presses alignment member 28 into engagement with the seat 16, or if arm 24 otherwise moves with respect to valve seat 16, alignment member 28 can angularly adjust as needed to maintain a true alignment of centerline 192 with central axis 34. Arm 24 also adjusts linearly within linear bearing 130 if fore-to-aft linear adjustment of alignment member 28 is also required.

Figure 3:
FIG. 3 is an enlarged, fragmentary, cross-sectional view of the valve seat adapter as supported by the valve seat, with the valve seat being shown in both its worn and original conditions.

Lower engaging portion 188 (FIG. 3) includes a frusto-conically shaped outer surface 198 adapted to engage valve seat 16. As note previously, valve seat liners are often inserted into new engines as well as worn engines. A new valve seat is represented in FIG. 3 by surface 202 (dashed lines), and a worn valve seat is represented by a surface 204 (solid lines). As shown, lower engaging portion 188 is adapted to reliably engage either surface acceptably.

Alignment member 28 is designed to be as short as possible, so that the total distance from valve seat 16 to the underside of arm 24 (ie., the height of alignment member 28) is minimized. This results in the arrangement being as stable as possible. Naturally, alignment member 28 must extend downwardly far enough so that arm 24 does not strike cylinder head 14 during use. (See FIG. 2.) In the preferred embodiment, a distance of about one inch or so has been found to be acceptable. Differently-sized alignment members 28 having differently-sized lower engagement portions 188 or differently heights can be selected. For example, an intake valve seat is often sized differently than an exhaust valve seat. Each, of course, will ordinarily have same-sized ball segment 186. Socket retainer 154 permits quick changeover to the newly-selected alignment member 28 merely by raising pin 172, sliding the socket retainer rearwardly, replacing the alignment member and repositioning the socket retainer so that the ball segment 186 is again encapsulated for the partial universal movement noted.

Internal bore 36 (FIG. 5) of alignment member 28 is adapted to closely receive a removable precision-ground guide bushing 208. Use of precision-ground guide bushing 208 permits use of close tolerances which improve accuracy during alignment and boring of valve guide 12. Further, since guide bushing 208 is removable, different inner diameters can be chosen as they are needed. Guide bushing 208 is an elongate sleeve with an outer diameter 213 adapted to fit snugly but removably in bore 36 in alignment member 28 and an inner diameter 214 adapted to snugly receive tools to be passed therethrough. Guide bushing 208 also includes a head 212 which abuts the top of alignment member 28 to retain the guide bushing 208 in bore 36.

Prior to energizing cylinder 26, carriage 22 and arm 24 are manipulated so that a proper alignment member 28 overlies the seat of the valve guide upon which work is to be done. An alignment pin 209 (FIG. 2) is then extended through the inner bore of guide bushing 208. Alignment pin 209, as shown, may take the form of a separate tool having an upper shank diameter adapted to closely engage bushing 208 and a lower, tapered shank diameter optimally shaped to find the center of the worn valve guide 12 to be reworked. Preferably, however, the reamer is used as the alignment pin in the same fashion as shown in the aforenoted Hungary Patent Publication 53832, filed May 16, 1989. The reamer has a pilot sized so as to locate the centerline of the valve guide. The shank of the reamer is closely embraced by the interior diameter of bushing 320, as described below. Once alignment has been achieved, cylinder 26 is activated to bring alignment member 28 into firm engagement with valve seat 16 to securely and finally locate alignment member 28. The reamer is then run through the worn valve guide to bore it to the desired size.

Figure 11:
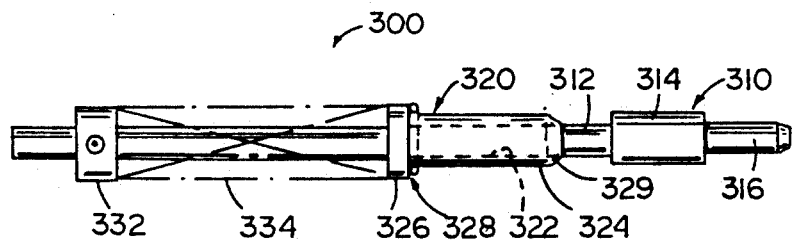
FIG. 11 is a side view of a boring tool.

An advantage of the present invention is that bushing 320 can be removed from alignment member 28 without releasing the air from cylinder 26. This makes the fixture particularly adaptable for use with the preferred combination reamer-alignment tool 300 shown in FIG. 11. Tool 300 includes a reamer 310 having a shank 312, a fluted reaming section 314 and a pilot 316. Tool 300 also includes bushing 320 having an inner diameter 322 which closely but rotatably receives shank 312 and an outer diameter 324 adapted to closely fit with bore 36 of alignment member 28. Bushing 320 has a shoulder 326 below which an O-ring 328 is positioned and a leading taper 329 to assist its insertion into bore 36. Bushing 320 is retained on reamer 310 by means of a retaining collar 332 and a compression spring 334.

Once alignment member 28 has been positioned adjacent a particular valve guide, the operator inserts tool 300 through bore 36, extending pilot 316 into the worn valve guide and seating bushing 320 with O-ring 328 in abutment with the upper surface of alignment member 28. With alignment having been thus achieved, cylinder 26 is activated, locking alignment member 28 against the valve seat with the axis of reamer 310, the axis of bushing 320 and the axis of bore 36 coinciding with the axis of the worn valve guide. The operator then forces the reamer 310 downwardly by manipulating the drill (not shown), bringing flutes 314 into cutting contact with the valve guide sidewalls. Shank 312 slides downwardly through bushing 320 during this process, compressing spring 334. When flutes 314 clear the valve guide shoulder, the operator withdraws tool 300 upwardly, removing reamer 310 including bushing 320 from bore 36. Thus, differently-sized reamers having bushings with identical outer diameters but different inner diameters can be utilized as needed, the outer diameters allowing the differently-sized reamers to be aligned in alignment member 28. Also, bore 36 of alignment member 28 can be used to assist in aligning an insertion tool for press-fittingly installing a valve guide insert into the selected valve guide 12. Still further, a broaching tool (not shown) can be placed through bore 36 and used to broach the newly-installed insert to a proper inner diameter without the need to move arm 24 out of the way. A patent describing one such broaching tool is U.S. Pat. No. 4,573,340 to Kammeraad, issued Mar. 4, 1986, entitled VALVE GUIDE LINER BROACHING TOOL, and a tool and method for installing valve guide inserts generally is disclosed in U.S. Pat. No. 3,828,415 to Kammeraad, issued Aug. 13, 1974, entitled METHOD AND APPARATUS FOR REBUILDING VALVE GUIDES. The entire contents of both of these patents are incorporated herein by reference.

Having described the fixture and interrelationship of parts, the use and advantages of the fixture will become apparent to a person of ordinary skill in the art. In use, fixture 10 is set up with the properly-sized alignment member 28 connected to arm 24 and retained thereto by ball retainer bracket 154 at universal joint 32. Supports 20 are spaced an appropriate distance apart, and a cylinder head 14 is placed thereon, with the valve seats 16 facing upwardly. Carriage 22 is moved laterally and arm 24 extended or retracted so as to position alignment member 28 over a selected valve guide 12. Also, arm holder 74 can be adjusted vertically and tilted angularly from side-to-side as needed by loosening and later retightening handle 88.

With arm 24 properly positioned, tool 300 is utilized in the manner previously described to align the axes of bore 34, bushing 300 and reamer 310 with the axis of the worn valve guide. cylinder 26 is then actuated by shifting control lever 114 which shifts control valve 112. This causes control valve 112 to communicate compressed air to cylinder 26 and in turn extend rod 108 into pivot bar 126. As rod 108 pressingly engages pivot bar 126., this causes arm 24 to bias alignment member 28 into tight engagement with the selected valve seat 16 corresponding to the selected valve guide 12. As arm 24 is thus biased, the resulting forces generated thereby cause fixture 10 to flex. The amount of flex depends upon the location of carriage 22 on rods 48, 50 and bar 52, and also the amount to which arm 24 is extended forwardly in linear bearing 130. Also, the amount of flexing movement depends upon other factors such as wear in any of bearings 54, 68, 130, the amount of pressure generated by cylinder 26 and the like.

Despite any flexing or other movement, alignment member 28 maintains its alignment with central axis 34 of valve guide 12 due to universal joint 32 and the ability of arm 24 to extend, retract and rotate. This is because ball 186 of alignment member 28 rotates angularly within socket 869mentB 148, 166 in any direction, and arm 24 extends or retracts fore or aft or rotates within linear bearing 130. Due to the spherical shape of universal joint 32, a balanced unbiased load is maintained on alignment member 28 regardless of the direction of angular movement. Also, due to the one-piece design of alignment member 28 and its minimized height, any undesirable play or looseness is substantially eliminated.

With alignment member 28 firmly held in place by cylinder 26, reamer 310 is moved downwardly through the valve guide to enlarge its bore. The reamer and attached bushing are then withdrawn. An insert insertion tool (not shown) can be extended through alignment member 28 into valve guide 12 to press-fittingly place a valve guide insert into the rebored valve guide 12 without moving arm 24. Subsequently, the insert insertion tool can be removed and a broaching tool can be inserted therethrough into the rebored valve guide bore 13, also without moving arm 24. Notably, boring tool 300, the insert insertion tool (not shown), and the broaching tool (not shown) can be inserted in succession through bore 34 and a suitable bushing without disengaging alignment member 28 from valve seat 16. Thus, improved alignment and productivity can be attained. Once all operations requiring alignment of bore 34 with the valve guide have been completed, the pressure on cylinder 26 is released, allowing arm 24 to be repositined and the operation repeated on a newly-selected valve seat 16.

In the foregoing description, it will be readily appreciated by those skilled in the art that modifications may be made to the invention without departing from the concepts disclosed herein. Such modifications are to be considered in the following claims, unless these claims by their language expressly state otherwise.

The embodiments of the invention in which an exclusive property or privilege is claimed are defined as follows.

1. A fixture for the reworking of valve guides in a cylinder head of an internal combustion engine, the cylinder head including a valve seat corresponding to each valve guide, each valve guide having a central axis, said fixture comprising:
 a frame;
 means on the frame for supporting the cylinder head;
 a carriage movably mounted on said frame for movement relative to the cylinder head in a first direction;
 an arm including a free end, said arm being movably mounted on said carriage for movement in a second direction which is transverse to said first direction, so that by moving said carriage with respect to said frame and said arm with respect to said carriage, said free end can be selectively positioned in proximity to a selected valve seat and the valve guide associated therewith;
 an alignment member having a central bore therethrough, said alignment member including means for engaging the valve seat such that the axis of said central bore is aligned with the central axis of the associated valve guide;
 means for at least partially universally joining said alignment member to said free end of said arm, said joining means including at least a partial ball-and-socket joint, said joining means permitting angular movement of said alignment member in any direction such that said alignment member can be positioned with the axis of said bore aligned with said central axis;
 means for positioning said alignment member such that the axis of said bore is aligned with the central axis of the valve guide; and
 means for biasing said engaging means into engagement with said valve seat, said joining means permitting the axial alignment of the axes of said bore and said central axis to be maintained despite relative movement between said fixture and said valve seat.

2. A fixture as defined in claim 1 including means for releasably retaining said alignment member on said free end of said arm.

3. A fixture as defined in claim 2 wherein said alignrnent member is one piece.

4. A fixture as defined in claim 3 wherein said joining means permits free access to said central bore BO that guide bushings or the like can be positioned therein or removed therefrom during the period that said engaging means is biased into engagement with said valve seat.

5. A fixture as defined in claim 4 wherein said aligrment member includes a ball section, and wherein said means for releasably retaining said alignment member includes a socket bar having a socket section formed therein for receiving said ball section, and further includes a ball retainer slidably retained on said socket bar, said ball retainer being movable between a position partially under said socket section to retain said ball section therein and a removed position for releasing said ball section.

6. A fixture as defined in claim 5 wherein said means for biasing includes a pneumatic cylinder connected to said carriage and positioned to engage said arm and bias said alignment member on said arm into engagement with said valve seat.

7. A fixture as defined in claim 1 wherein said alignment member is one piece.

8. A fixture as defined in claim 1 wherein said joining means permits free access to said central bore so that guide bushings or the like can be positioned therein or removed therefrom during the period that said engaging means is biased into engagement with said valve seat.

9. A fixture as defined in claim 1 wherein said alignment member includes a ball section, and wherein said means for releasably retaining said alignment member includes a socket bar having a socket section formed therein for receiving said ball section, and further includes a ball retainer slidably retained on said socket bar, said ball retainer being movable between a position partially under said socket section to retain said ball section therein, and a removed position for releasing said ball section.

10. A fixture as defined in claim 1 including a plurality of said alignment members and wherein said free end includes means for releasably retaining one of said alignment members in said free end without the use of separate fasteners.

11. A fixture as defined in claim 1 wherein said engagement means for engaging the valve seat is located a maximum distance of about one inch or less from said arm so that said engagement means can engage the valve seat but without interfering with the angular movement of said alignment member, said location thus improving the alignment of said alignment member relative to said valve seat by increasing the stability of the arrangement of said alignment member and said arm as said alignment member is biased into the valve seat causing said fixture and Bald valve seat to move relative to each other as said fixture flexes.

12. A fixture for the reworking of valve guides in a cylinder head of an internal combustion engine, the cylinder head including a valve seat corresponding to each valve guide, each valve guide having a central axis, said fixture comprising:

a frame;

means on the frame for supporting the cylinder head;

a carriage movably mounted on said frame for movement relative to the cylinder head in a first directionl an arm including a free end, said arm being movably mounted on said carriage for movement in a second direction which is transverse to said first direction, so that by moving said carriage with respect to said frame and said arm with respect to said carriage, said free end can be selectively positioned in proximity to a selected valve seat and the valve guide associated therewith; and a alignment member having a central bore therethrough, said aligrment member including means for engaging the valve seat such that the axis of said central bore is aligned with the central axis of the associated valve guide;

means for joining said alignment member to said free end of said arm, said joining means permitting angular movement of said alignment member with respect to the free end of said arm;

means for positioning said alignment member such that the axis of said bore is aligned with said central axis; and means for biasing said engaging means into engagement with said valve seat, said joining means permitting the axial alignment of the axes of said bore and said central axis to be maintained despite relative movement between said fixture and said valve seat, said joining means permitting free access to said central bore so that guide bushings or the like can be positioned therein or removed therefrom during the period that said engaging means is biased into engagement with said valve seat.

13. A fixture for the reworking of valve guides in a cylinder head of an internal combustion engine, the cylinder head including a valve seat corresponding to each valve guide, each valve guide having a central axis, said fixture comprising:

a frame;

means on the frame for supporting the cylinder head;

a carriage movably mounted on said frame for movement relative to the cylinder head in a first direction;

an arm including a free end, said arm being movably mounted on said carriage for movement in a second direction which is transverse to said first direction, so that by moving said carriage with respect to said frame and said arm with respect to said carriage, said free end can be selectively positioned in proximity to a selected valve seat and the valve guide associated therewith;

an alignment member having a central bore therethrough, said alignment member including means for engaging the valve seat such that the axis of said central bore is aligned with the central axis of the associated valve guide;

means for releasably affixing said alignment member to said free end of said arm, said affixing means permitting angular movement of said alignment member in any direction such that said alignment member can be positioned with the axis of said bore aligned with said central axis;

means for positioning said alignment member such that the axis of said bore is aligned with the central axis of the valve guide; and means for biasing said engaging means into engagement with said valve seat, said affixing means permitting the axial alignment of the axes of said bore and said central axis to be maintained despite relative movement between said fixture and said valve seat.

14. A fixture as defined in claim 13 including a plurality of different aligniaent members adapted to engage differing types of valve seats, and wherein said means for releasably affixing will accommodate and affix to said free end of said arm any of said plurality of said different aligrauent members.

15. An alignment member for use on a fixture for reworking valve guides in a cylinder head of an internal combustion engine, the cylinder head including a valve seat corresponding to each valve guide, each valve guide having a central axis, the alignment member comprising:

a single-piece member having a ball section, a valve seat engagement section, and a stem interconnecting said ball section and said engagement section, said valve seat engagement section defining a frusto-conically shaped outer surface adapted to forcibly engage a selected valve seat;

a central bore extending longitudinally through said ball section, said stem, and said engagement member, said central bore defining an axis that can be aligned with the central axis of the selected valve guide; and a series of guide bushings adapted to be interchangeably positioned within said central bore during the period that said engagement section is forcibly engaged with said selected valve seat.

16. An alignment member as defined in claim 15 wherein siad ball section defines a sphere having a center point, and the distance from siad center point to siad engagement section is about one inch or less.

* * * * *

UNITED STATES PATENT AND TRADEMARK OFFICE
CERTIFICATE OF CORRECTION

PATENT NO. : 5,281,057
DATED : January 25, 1994
INVENTOR(S) : Robert T. Ritt

Page 1 of 3

It is certified that error appears in the above-indentified patent and that said Letters Patent is hereby corrected as shown below:

In the Abstract, line 11;
"toward th.e" should be --toward the--.

Column 2, line 67;
"alignment" should be --alignment--.

Column 3, line 4;
"Unshaped" should be --U-shaped--.

Column 3, line 8;
"engageTaent" should be --engagement--.

Column 3, lines 18 & 19;
"DEURIPTION" should be --DESCRIPTION--.

Column 3, line 43;
"PREFERREDA-MBODIMENT" should be --PREFERRED EMBODIMENT--.

Column 4, line 32;
"comrAunicates" should be --communicates--.

Column 4, line 33;
"alignment" should be --alignment--.

Column 4, line 55;
"d6sired" should be --desired--.

Column 5, line 63;
"alignment" should be --alignment--.

Column 5, line 65;
"Unshaped" should be --U-shaped--.

Column 6, line 22;
"Unshaped" should be --U-shaped--.

Column 6, lines 39 & 40;
"alignunent" should be --alignment--.

UNITED STATES PATENT AND TRADEMARK OFFICE
CERTIFICATE OF CORRECTION

PATENT NO. : 5,281,057           Page 2 of 3
DATED     : January 25, 1994
INVENTOR(S) : Robert T. Ritt It is certified that error appears in the above-indentified patent and that said Letters Patent is hereby corrected as shown below:

Column 7, line 6;
   "alignment" should be --alignment--.

Column 7, line 68;
   "aligmuent" should be --alignment--.

Column 8, line 50;
   "cylinder 26" should be --Cylinder 26--.

Column 8, line 55;
   "126.," should be --126,--.

Column 8, line 55;
   "aligmuent" should be --alignment--.

Column 9, line 3;
   "869mentB" should be --segments--.

Column 10, lines 16 & 17;
   "alignraent" should be --alignment--.

Column 10, line 19;
   "BO that" should be --so that--.

Column 10, lines 24 & 25;
   "alignment" should be --alignment--.

Column 11, line 4;
   "and Bald" should be --and said--.

Column 11, lines 14 & 15;
   "directionl" should be --direction;--.

Column 11, line 25;
   "alignment" should be --alignment--.

Column 12, line 27;
   "aligniaent" should be --alignment--.

UNITED STATES PATENT AND TRADEMARK OFFICE
CERTIFICATE OF CORRECTION

PATENT NO. : 5,281,057
DATED : January 25, 1994
INVENTOR(S) : Robert T. Ritt

It is certified that error appears in the above-indentified patent and that said Letters Patent is hereby corrected as shown below:

Column 12, line 31;
"aligrauent" should be --alignment--.

Column 12, line 55;
"siad" should be --said--.

Column 12, line 56;
"siad" (both occurrences) should be --said--.

Signed and Sealed this

Sixth Day of September, 1994

Attest:

BRUCE LEHMAN

*Attesting Officer*   *Commissioner of Patents and Trademarks*